United States Patent
Lucas et al.

(10) Patent No.: US 9,322,507 B2
(45) Date of Patent: Apr. 26, 2016

(54) WALL MOUNTING SYSTEM AND METHOD

(71) Applicant: Ergotron, Inc., Eagan, MN (US)

(72) Inventors: James R. Lucas, Eagan, MN (US); Patrick Leonard Plehn, Gilbert, AZ (US)

(73) Assignee: Ergotron, Inc., St. Paul, MN (US)

( * ) Notice: Subject to any disclaimer, the term of this patent is extended or adjusted under 35 U.S.C. 154(b) by 152 days.

(21) Appl. No.: 14/078,913

(22) Filed: Nov. 13, 2013

(65) Prior Publication Data

US 2014/0138504 A1    May 22, 2014

Related U.S. Application Data

(60) Provisional application No. 61/727,460, filed on Nov. 16, 2012.

(51) Int. Cl.
*A47B 96/00* (2006.01)
*F16M 13/02* (2006.01)
*F16M 11/10* (2006.01)
*F16M 11/04* (2006.01)

(52) U.S. Cl.
CPC ............. *F16M 13/02* (2013.01); *F16M 11/041* (2013.01); *F16M 11/105* (2013.01); *F16M 2200/02* (2013.01); *F16M 2200/028* (2013.01); *Y10T 29/49826* (2015.01)

(58) Field of Classification Search
CPC ..... F16M 11/041; F16M 11/38; F16M 11/10; F16M 13/02; F16B 2/12; F16B 5/0664
USPC ............. 248/292.14, 294.1, 917, 222.14, 248/292.13, 309.1, 304, 317, 323, 221.11
See application file for complete search history.

(56) References Cited

U.S. PATENT DOCUMENTS

| 3,791,709 | A  |    | 2/1974  | Cross |
|-----------|----|----|---------|-------|
| 4,611,780 | A  |    | 9/1986  | Robertson |
| 7,441,739 | B2 | *  | 10/2008 | Huang ................... F16M 13/02 248/292.14 |
| 8,235,341 | B2 | *  | 8/2012  | Taylor ................... F16M 11/10 248/201 |

FOREIGN PATENT DOCUMENTS

| AT |      296525 B  | 2/1972 |
| CN |   102230564 A  | 11/2011 |
| CN |   202381950 U  | 8/2012 |
| DE | 202005019637 U1 | 5/2006 |
| GB |     1220412 A  | 1/1971 |
| WO | WO-2011/003115 A2 | 1/2011 |
| WO | WO-2014/078367 A1 | 5/2014 |

OTHER PUBLICATIONS

"International Application Serial No. PCT/US2013/069819, International Search Report mailed Mar. 5, 2014", 5 pgs.

(Continued)

*Primary Examiner* — Todd M Epps
(74) *Attorney, Agent, or Firm* — Schwegman Lundberg & Woessner, P.A.

(57) ABSTRACT

A device for a mounting system for positioning electronic equipment. The device having a first rail fixedly positionable on a first planar surface and engageable with a mechanism carried by the electronic equipment, and a leveling mechanism. The leveling mechanism having a first elongated aperture adapted to receive a mounting hardware.

23 Claims, 7 Drawing Sheets (56) References Cited

OTHER PUBLICATIONS

"International Application Serial No. PCT/US2013/069819, Written Opinion mailed Mar. 5, 2014", 6 pgs.

"International Application Serial No. PCT/US2013/069819, International Preliminary Report on Patentability mailed May 28, 2015", 8 pgs.

"Australian Application Serial No. 2013344893, First Examiner's Report mailed Nov. 26, 2015", 3 pgs.

"Chinese Application Serial No. 201380069940.X, Office Action mailed Jan. 26, 2016", (w/ English Translation), 9 pgs.

* cited by examiner

WALL MOUNTING SYSTEM AND METHOD

RELATED APPLICATIONS

This application claims priority to U.S. Provisional Application Ser. No. 61/727,460, filed Nov. 16, 2012, the contents of which are hereby incorporated by reference.

FIELD

This disclosure generally relates to systems and methods for a mounting system for positioning electronic equipment.

BACKGROUND

Electronic equipment, such as flat panel displays and monitors are commonly mounted to a wall for viewing.

SUMMARY

Embodiments of the invention include a device for a mounting system for positioning electronic equipment. The device can include a first rail engageable with a mechanism carried by the electronic equipment and a leveling mechanism. The first rail can be fixedly positionable on a first planar surface at a first position. The leveling mechanism can include one or more elongated apertures defined by the first rail, and adapted to receive mounting hardware. The leveling mechanism can be adapted to allow the first rail to rotatingly move from the first position to a second position on the first planar surface. In some embodiments, the first planar surface can be a vertical wall.

An embodiment of a method for positioning a first frame of a mounting system on a vertical surface can include one or more of the following steps: (i) providing a mounting system with a first frame having at least one elongated aperture, (ii) positioning the first frame on the vertical surface, (iii) installing mounting hardware into the vertical surface through the elongated aperture, (iv) leveling the position of the first frame with respect to the vertical surface by sliding the elongated aperture with respect to the mounting hardware, and (v) securing the mounting hardware with respect to the vertical wall to fix the leveled position of the first frame with respect to the vertical wall.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Figure 1:
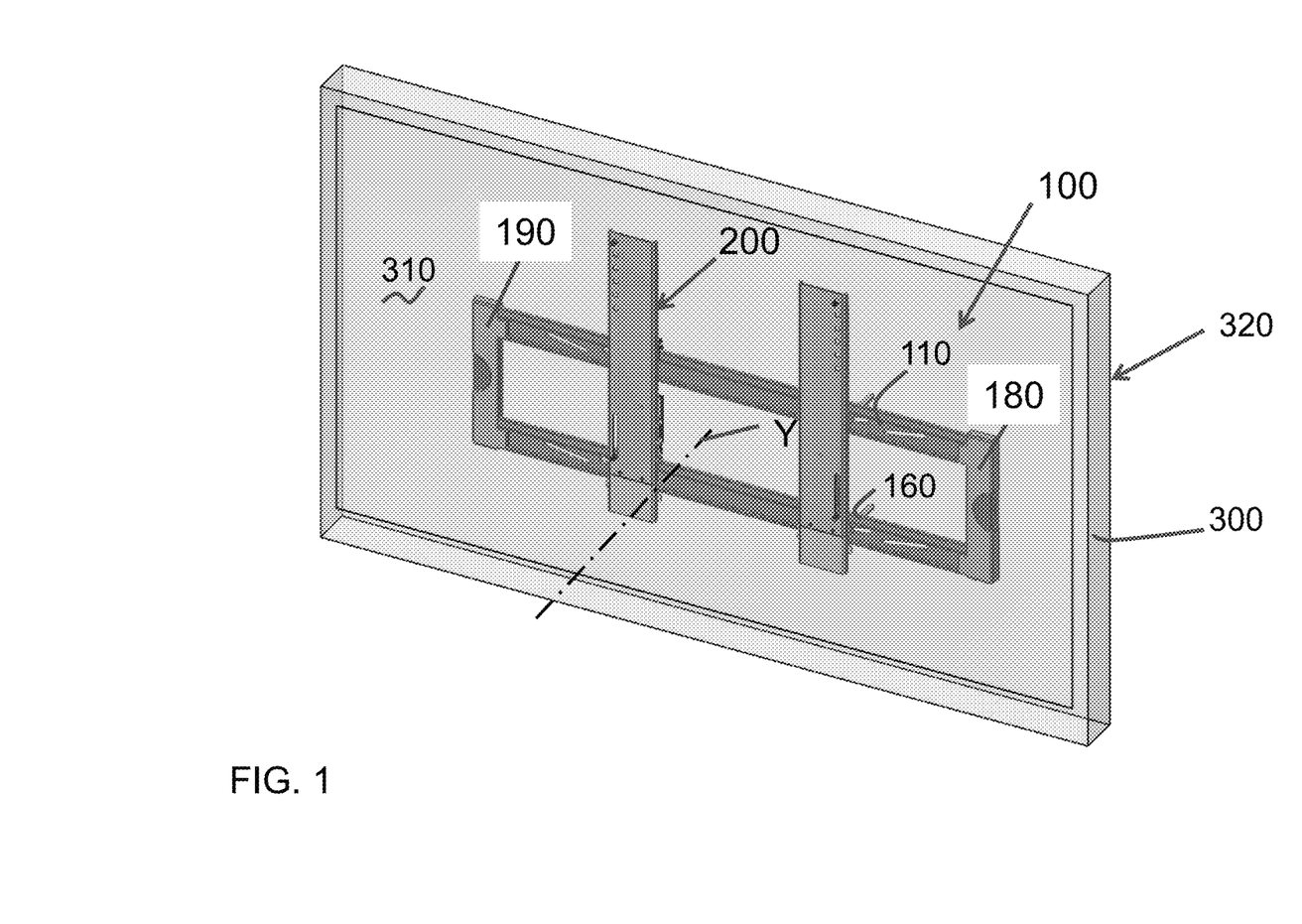
FIG. 1 is a front perspective view of a device for a mounting system for positioning electronic equipment, with the electronic equipment shown transparently.
Figure 2:
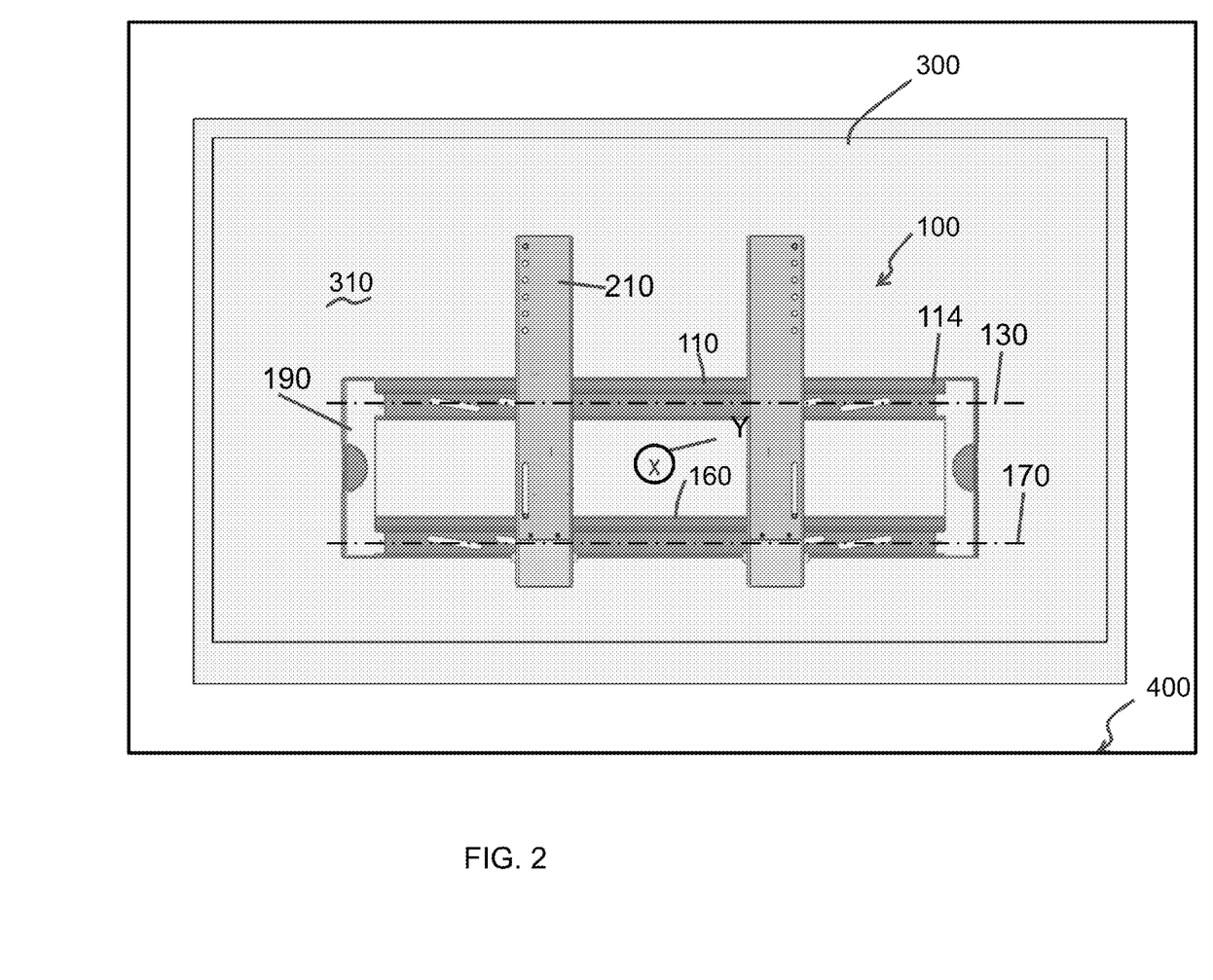
FIG. 2 is a front view of the device of FIG. 1.
Figure 3:
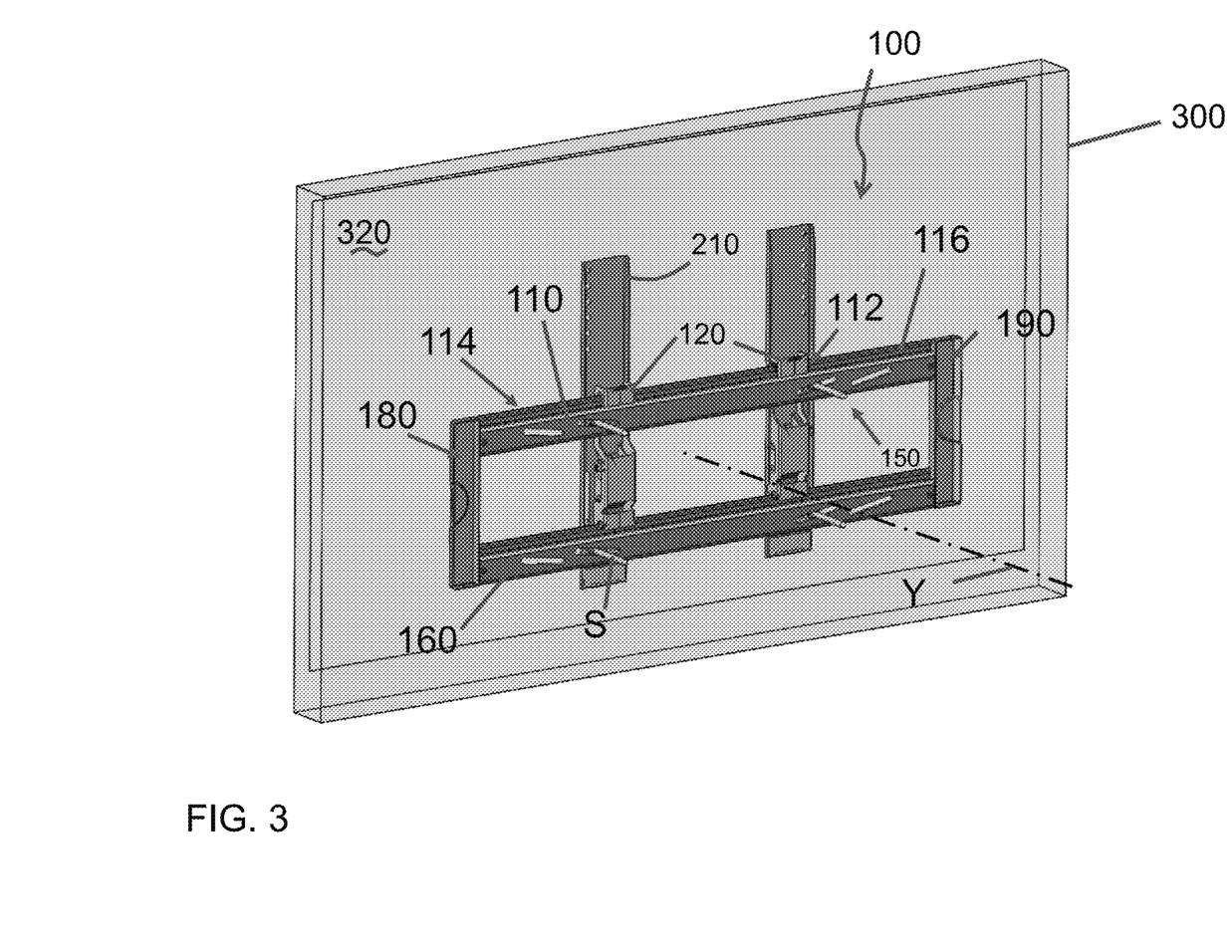
FIG. 3 is a rear perspective view of the device of FIG. 1.

FIGS. 1 and 2, respectively, illustrate a front perspective view and a front elevation view of a device 100, and FIG. 3 shows a back perspective view of the device 100 for a mounting system 200 (e.g. wall bracket with a frame) which can be used for positioning electronic equipment 300 (e.g., a flat panel display such as a television or a monitor). In FIGS. 1 and 2, the front surface 310 of the electronic equipment 300 has been shown as a transparent surface. FIG. 3 shows the rear view of a back surface 320 of the electronic equipment. Such devices for mounting systems can be useful for leveling and/or positioning the electronic equipment 300 on a first planar surface 400, such as a vertical wall.

With continued reference to FIGS. 1 through 3, the device 100 can include a first rail 110 engagable with a mechanism 120 (e.g., a bracket, a clamp or an attachment mechanism) carried by the electronic equipment 300. The first rail 110 can have a first axis 130. The first rail 110 can be fixedly positionable on the first planar surface 400 (e.g. a vertical wall) at a first position. The first rail 110 can include a proximal surface 114 adapted to receive the back surface 320 of the electronic equipment 300. The first rail 110 can include a distal surface 116 operatively coupled with a first frame 210 of the mounting system 200.

Figure 4:
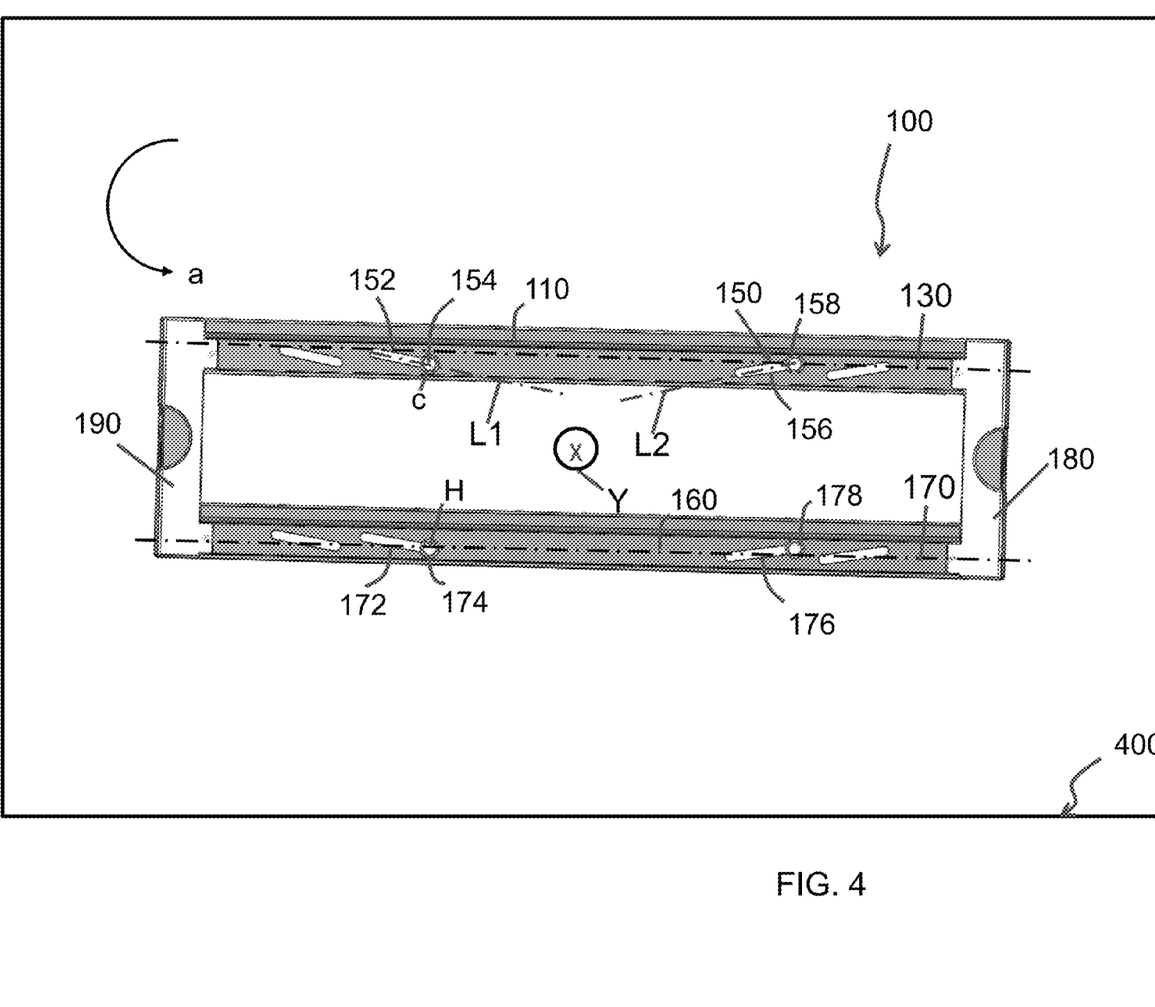
FIG. 4 is a front view of the device of FIG. 1 in a first position along a first planar surface.
Figure 5:
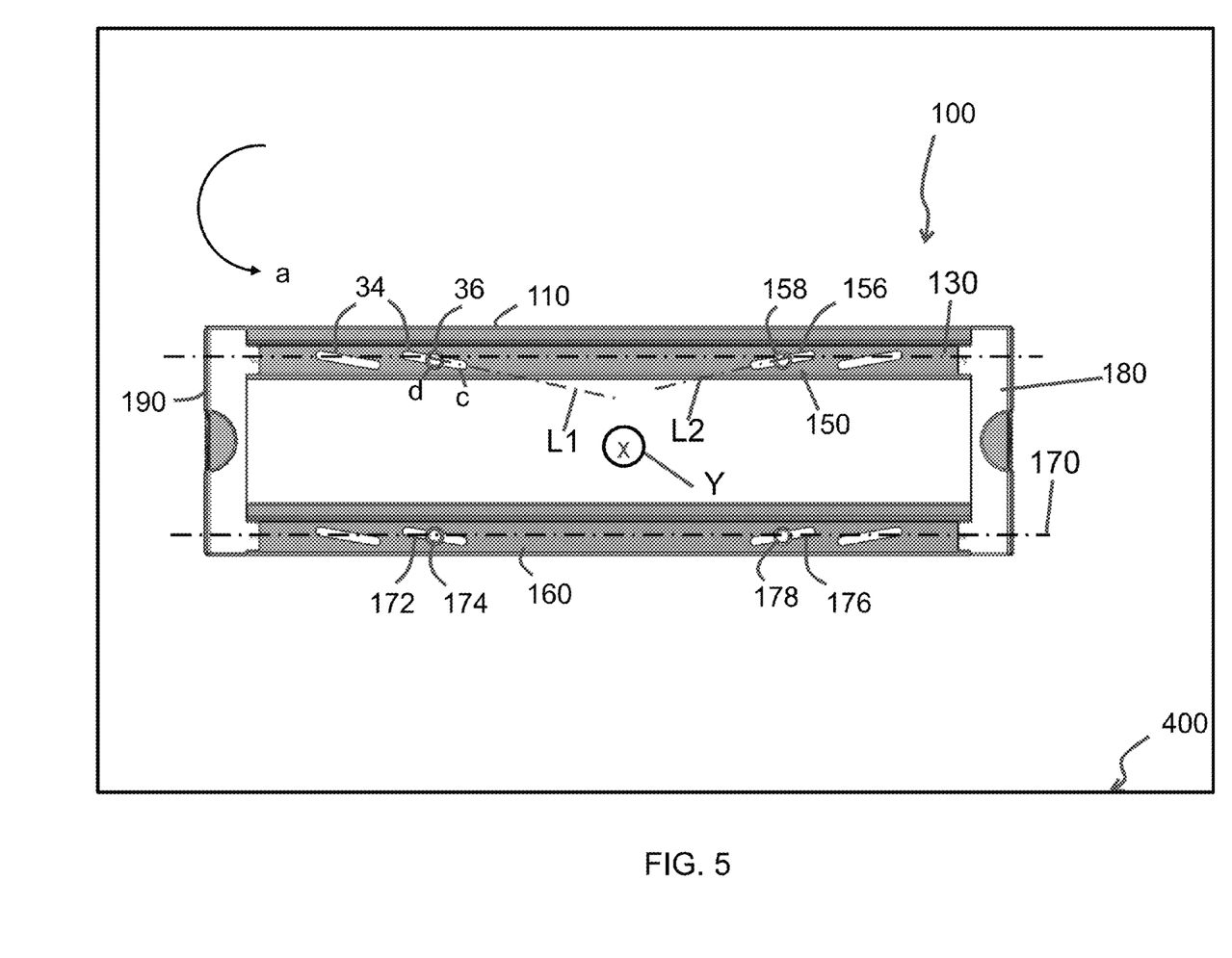
FIG. 5 is a front view of the device of FIG. 1 in a second position along the first planar surface.

Referring now to FIGS. 4 and 5, the device 100 includes a leveling mechanism 150 can be adapted to allow the first rail 110 to rotatingly move from the first position to a second position on the first planar surface 400 to level the first rail 110 with respect to the first planar surface 400. The leveling mechanism 150 can include a first elongated aperture 152 defined by the first rail 110. The leveling mechanism 150 can be adapted to receive a first mounting hardware 154. The shape of the first elongated aperture 152 can allow for movement of the first rail 110 in any direction (constrained along the first planar surface 400) relative to first mounting hardware 154 extending through the first elongated aperture 152. In some embodiments, the first mounting hardware 154 can remain unfastened until a desired position and orientation of the device 100 is achieved.

In the illustrated embodiment shown in FIG. 4, the first rail 110 is at the first position on the first planar surface 400. The first mounting hardware 154 engages with the first elongated aperture 152 at a location "c" defined along a length of the first elongated aperture 152. Upon rotation along direction "a", the first rail 110 moves to the second position on the first planar surface 400, as seen in FIG. 5. This rotational movement of the first rail 110 is accompanied by a sliding movement of the first elongated aperture 152 about the first mounting hardware 154. In the embodiment shown in FIG. 5, the first mounting hardware 154 engages with the first elongated aperture 152 at a position "d" defined along the length of the first elongated aperture 152.

In some embodiments, the first elongated aperture can have an axis that is skewed relative to a longitudinal axis of the first rail. In a non-limiting embodiment illustrated in FIGS. 4 and 5, the first elongated aperture 152 includes a first longitudinal axis L1 nonparallel to the first axis 130 of the first rail 110. In such embodiments, the first rail 110 can be rotated about a third axis Y. The depiction of the third axis "Y" in the drawings is only for purposes of illustrating the concept, and the actual axis of rotation may be at another location and/or may move during a rotational adjustment. As mentioned elsewhere herein, the first elongated aperture 152 can slidably engage with, and rotate relative to the mounting hardware. In the illustrated embodiments, the first elongated aperture 152 is shaped as a rounded-rectangle. As best seen in FIG. 3, the first elongated aperture 152 can define a slot for the passage of the mounting hardware such that when the device 100 is repositioned by rotating about the third axis Y, the first elongated aperture 152 can slide along the first longitudinal axis L1 relative to the mounting hardware.

Referring again to FIGS. 4 and 5, the device 100 can include a second elongated aperture 156 positioned on the first rail 110. The second elongated aperture 156 includes a second longitudinal axis L2 nonparallel to the first axis 130 of the first rail 110. The second elongated aperture 156 can be adapted to receive a second mounting hardware 158. In such embodiments, the second longitudinal axis L2 can be nonparallel to the first longitudinal axis L1 of the first elongated aperture 152. In a non-limiting exemplary embodiment, the first and second longitudinal axes can be oriented such that the device 100 can be generally rotated about the third axis Y when attached to the vertical wall until it is positioned and oriented suitably. The first elongated aperture 152 and second elongated aperture 156 can be positioned equidistant and opposite each other from the third axis Y. The third axis Y can be perpendicular to the first axis 130 of the first rail 110.

In some embodiments, the device 100 can include a second rail 160 having a second axis 170. The second rail 160 can be connected to the first rail 110 by a first side rail 180 and a second side rail 190, as seen in FIGS. 1-3. In such embodiments, the first and second rail 160 can be substantially parallel to each other. In the illustrated embodiments seen in FIGS. 1-3, the first and second rails 110, 160 and the first and second side rails 180, 190 form a rectangular shape. In general, the first and second rails 110, 160, together with the first and second side rails 180, 190 can form a substantially quadrilateral shape. The second axis 170 of the second rail 160 can be parallel to the first axis 130 of the first rail 110. The second rail 160 can be substantially similar to the first rail 110.

In some embodiments, the second rail 160 can define third elongated aperture 172 adapted to receive third mounting hardware 174, and fourth elongated aperture 176 adapted to receive fourth mounting hardware 178. The third and fourth elongated apertures 172, 178 can be cooperatively positioned with the first and second elongated apertures 152, 156. In the illustrated embodiments best seen in FIGS. 4 and 5, the third and fourth apertures 172, 176 are positioned substantially parallel to the first and second elongated apertures 152, 156. The third and fourth elongated apertures 172, 176 can be equidistant from the third axis Y. In the illustrated embodiment, the first and second rails 110, 160 each include four elongated apertures. In such embodiments, the position, orientation and shape of each of the elongated apertures can be adjusted cooperatively to allow for positioning of the electronic equipment 300. Although each elongated aperture is shown in FIGS. 3-5 as a substantially straight slot with a rounded rectangular shape, any geometry, position, orientation and shape of each of the elongated apertures that allow for rotational movement of the first and second rails 110, 160 to a desired orientation is contemplated.

The mounting hardware can include any suitable structure for allowing movement within the elongated slot and for securing the device to the vertical surface. As best seen in FIGS. 3-5, the mounting hardware can include a head "H" for engaging with a front of the first rail 110 and a shank "S" for extending through any of the elongated apertures into the vertical surface. In some embodiments, the mounting hardware can be a bolt. In other embodiments, the mounting hardware can be a pin or a similar fastener. In the illustrated embodiments, each of the first, second, third and fourth elongated apertures engaging with first, second, third and fourth mounting hardware that are substantially similar to each other. In other embodiments, the elongated apertures can receive mounting hardware of various shapes and configurations. Such embodiments can be useful for mounting and leveling electronic equipment with non-standard, dissimilar bolts or similar fasteners.

Figure 6:
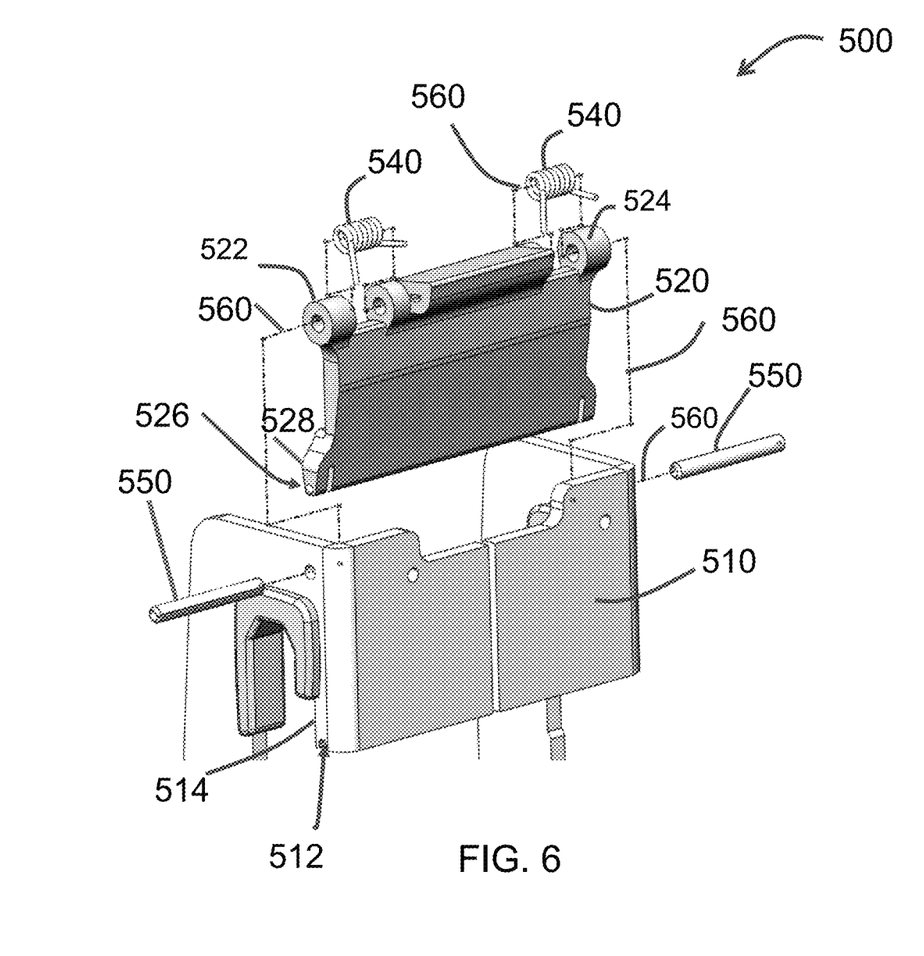
FIG. 6 is an exploded perspective view of an attachment mechanism carried by the electronic equipment.
Figure 7A:
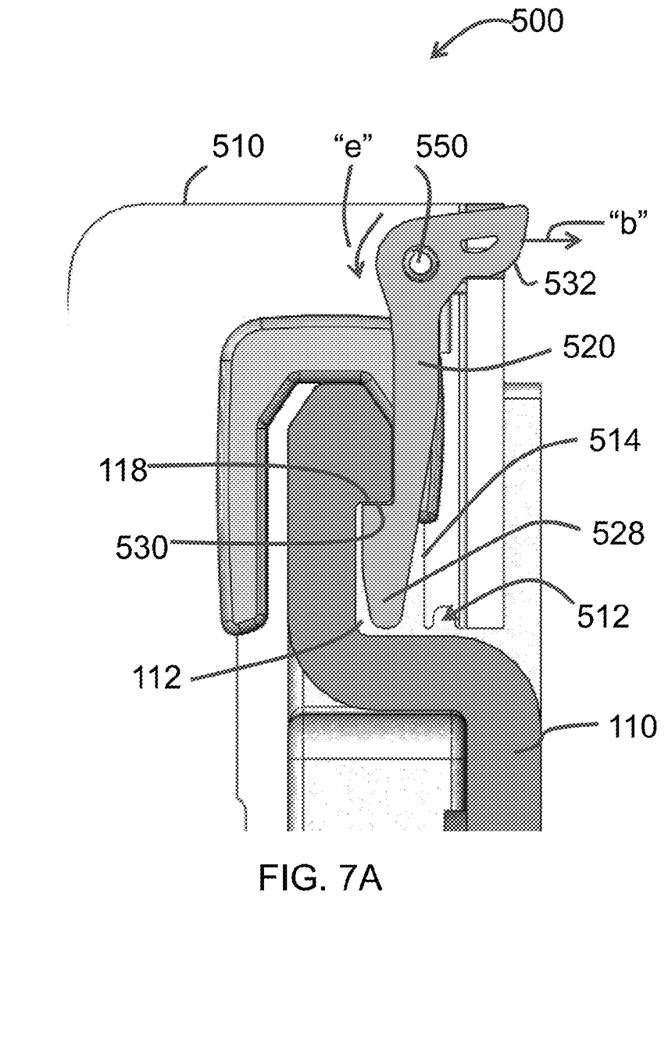
FIG. 7A is side view of the attachment mechanism of FIG. 6 in a locked position.

As mentioned elsewhere herein, the first rail 110 can be engageable with the mechanism 120 carried by the electronic equipment 300. Any mechanism (e.g., bracket 510s, clamps, and the like) can be utilized, including the exemplary embodiment of an attachment mechanism 500 illustrated in FIGS. 6-7B. FIG. 6 is an exploded perspective view of the exemplary attachment mechanism 500. As shown, the attachment mechanism 500 can include a bracket 510, a locking plate 520, spring 540 (e.g., torsion spring 540) and pins 550 disposed about a common axis, 560. The bracket 510 can be configured to engage with the first frame 210 of the mounting system 200. Each pin 550 extends through the bracket 510, a first section 522 of locking plate 520, the spring 540, and a second section 524 of locking plate 520. The pins 550 can rotatably couple the bracket 510 and locking plate 520 such that the locking plate 520 can be rotated about pins 550 relative to the bracket 510. Additionally, spring 540 can be configured for applying forces in opposing directions on both the bracket 510 and the locking plate 520.

With continued reference to FIG. 6, the bracket 510 can include detents 512 configured for engaging and retaining balls 526 of the locking plate 520. Accordingly, the attachment mechanism 500 can be configured such that in operation, the forces exerted by spring 540 act to maintain a separation between a surface 514 of the bracket 510 and at least a section 528 of the locking plate 520. Rotating the section 528 of the locking plate 520 towards the surface 514 of the bracket 510 (e.g., by applying a rotational force on the locking plate 520 about pin), can counter the opposing forces exerted by spring 540. The section 528 of the locking plate 520 can be rotated towards the surface 514 of the bracket 510 until balls 526 are engaged within and retained by detents 512.

Figure 7B:
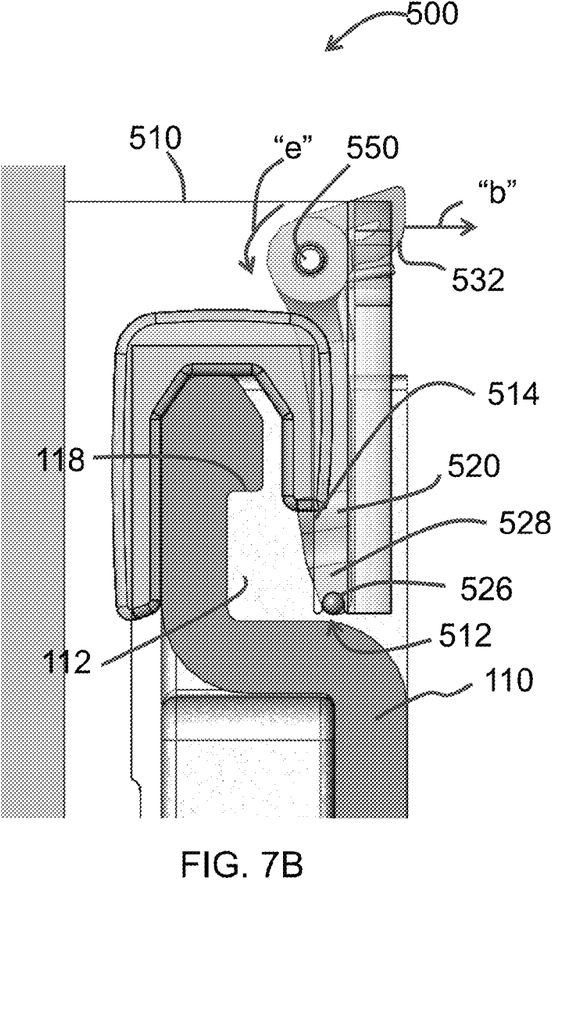
FIG. 7B is a side view of the attachment mechanism of FIG. 7 in an unlocked position.

FIGS. 7A and 7B, respectively, illustrate the first rail 110 and the attachment mechanism 500 in a "locked" and an "unlocked" state. In a non-limiting exemplary embodiment, the attachment mechanism 500 can be engageable with a first channel 112 defined by the first rail 110. As shown in FIG. 7A, the locking plate 520 can include a surface 530 in apposition to and engageable with a surface 118 of first rail 110. As previously described, the opposing forces exerted by spring 540 keep the section 528 of the locking plate 520 and the surface 514 of the bracket 510 spaced apart. Thus, when the bracket 510 is placed over and straddles an edge of the first rail 110, the section 528 of the locking plate 520 is positioned within the channel 112 of the first rail 110, and surface 118 of the first rail 110 is positioned over the surface 530 of the locking plate 520. As illustrated, the surface 530 of the locking plate 520 and the surface 118 of the first rail 110 are engaged such that any upward vertical movement of the locking plate 520 can be inhibited by the surface 118 of the first rail 110. Accordingly, any upward vertical movement of the bracket 510 may also be inhibited, and the attachment mechanism 500 can remain in the "locked" state on the first rail 110.

As illustrated in FIGS. 7A-7B, the locking plate 520 can include a cam surface 532. In certain embodiments of the locking plate 520, the cam surface 532 can be configured for rotational movement when pushed against a surface (e.g., first planar surface 400). The locking plate 520 can be releasably retained in a fixed position relative to the bracket 510 by a locking mechanism. In an example implementation, the locking mechanism can include balls 526 and detents 512. When a force is applied on the attachment mechanism 500 (and consequently on the locking plate 520) in the direction "b", the cam surface 532 abuts against the first planar surface 400. In some embodiments, the force can be applied by a user pushing on the electronic equipment. The bracket 510 can move a distance laterally with respect to the first rail 110 when the force is applied in the direction "b". Continuous application of the force may rotate the locking plate 520 about the pins 550 in the direction "e". Such rotational movement of the locking plate 520 can also move the section 528 out of the channel 112 and towards the surface 514 until balls 526 are received within and retained in detents 512. The surface 530 of the locking plate 520 also separates from the surface 118 of the first rail 110 such that any vertical movement of the bracket 510 may not be hindered and/or inhibited. The attachment mechanism may be considered to be in an "unlocked" state and disengaged with the first rail 110.

A method of positioning a first frame of a mounting system 200 for on a vertical surface, can include one or more of the following steps: (i) providing the mounting system 200 with the first frame having at least one first elongated aperture 152, (ii) positioning the first frame on the vertical wall, (iii) installing mounting hardware into the vertical surface through the first elongated aperture 152, (iv) leveling the position of the first frame with respect to the vertical surface by sliding the first elongated aperture 152 with respect to the mounting hardware, and (v) securing the mounting hardware with respect to the vertical wall to fix the leveled position of the first frame with respect to the vertical wall.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A device for a mounting system for positioning electronic equipment, the device comprising:
   a first rail fixedly positionable on a first planar surface at a first position and engagable with a frame carried by the electronic equipment;
   a leveling mechanism comprising a first elongated aperture defined by the first rail and a second elongated aperture defined by the first rail, each adapted to receive a first mounting hardware and a second mounting hardware, respectively, the leveling mechanism adapted to allow the first rail to rotatingly move from the first position to a second position on the first planar surface to level the first rail with respect to the first planar surface; and
   an attachment mechanism including:
      a bracket configured to attach to the frame;
      a locking plate configured to releasably engage a portion of the first rail;
      a spring configured to apply opposing forces on both the bracket and the locking plate;
      a pin extending through at least a portion of the bracket, the locking plate, and the spring, the pin configured to rotatably couple the bracket and the locking plate; and
      a locking mechanism configured to releasably retain the locking plate in a fixed position relative to the bracket.

2. The device of claim 1, wherein the device is of quadrilateral shape.

3. The device of claim 1, further comprising a second rail connected to the first rail by a first side rail and a second side rail.

4. The device of claim 1, wherein the first mounting hardware has a head for engaging with a front of the first rail and a shank for extending through the first elongated aperture and the second mounting hardware has a head for engaging with a front of the first rail and a shank for extending through the second elongated aperture.

5. The device of claim 1, wherein the first and second mounting hardware each includes a bolt.

6. The device of claim 1, wherein the first elongated aperture has an axis that is skewed relative to a longitudinal axis of the first rail.

7. The device of claim 3, the first rail having a first axis and a second rail having a second axis, the second axis being parallel to the first axis.

8. The device of claim 7, wherein the first elongated aperture includes a longitudinal axis nonparallel to the first axis of the first rail.

9. The device of claim 8, wherein the second elongated aperture includes a second longitudinal axis nonparallel to the first axis of the first rail.

10. The device of claim 9, wherein the first elongated aperture and the second elongated aperture are positioned equidistant and opposite each other from a third axis, the third axis being perpendicular to the first axis of the first rail.

11. The device of claim 10, wherein the first and second elongated apertures are angled such that the first rail rotates about the third axis as the first rail is positioned with respect to the first planar surface.

12. The device of claim 1, wherein the first rail includes a proximal surface adapted to receive a rear surface of the electronic equipment, the first rail further comprising a distal surface operatively coupled with the frame.

13. The device of claim 1, wherein the first planar surface is a vertical wall.

14. The device of claim 1, further comprising a second rail spaced from and parallel to the first rail, the second rail defining a third elongated aperture and a fourth elongated aperture, each having an axis that is skewed relative to a longitudinal axis of the second rail.

15. The device of claim 1, wherein the locking mechanism includes:
   a ball engaged to the locking plate; and
   a detent defined by a surface of the bracket, the detent configured to receive the ball.

16. The device of claim 1, wherein a portion of the locking plate defines a cam surface configured to assist a rotation of the locking plate about the pin when the attachment mechanism is pushed again a surface.

17. A device for a mounting system for positioning an electronic device with respect to a vertical surface, comprising:
- a first rail;
- a leveling mechanism comprising a first elongated aperture and a second elongated aperture each defined by the first rail and adapted to receive a first mounting hardware and a second mounting hardware, respectively, the first and second elongated apertures being cooperatively positioned such that the first rail is rotatable within a vertical plane with respect to the first and second mounting hardware; and
- an attachment mechanism including:
  - a bracket configured to attach to the frame;
  - a locking plate configured to releasably engage a portion of the first rail;
  - a spring configured to apply opposing forces on both the bracket and the locking plate;
  - a pin extending through at least a portion of the bracket, the locking plate, and the spring, the pin configured to rotatable couple the bracket and the locking plate; and
  - a locking mechanism configured to releasably retain the locking plate in a fixed position relative to the bracket.

18. The device of claim 17, wherein the first and second elongated apertures are each skewed relative to a longitudinal axis of the first rail.

19. The device of claim 17, further comprising a second rail spaced from the first rail, the second rail defining third and fourth elongated apertures cooperatively positioned with the first and second elongated apertures.

20. The device of claim 19, wherein each of the first, second, third and fourth elongated apertures includes a substantially straight slot.

21. The device of claim 17, wherein the locking mechanism includes:
- a ball engaged to the locking plate; and
- a detent defined by a surface of the bracket, the detent configured to receive the ball.

22. The device of claim 17, wherein a portion of the locking plate defines a cam surface configured to assist a rotation of the locking plate about the pin when the attachment mechanism is pushed again a surface.

23. A device for a mounting system for positioning electronic equipment, the device comprising:
- a first rail fixedly positionable on a first planar surface at a first position and engagable with a frame carried by the electronic equipment;
- a leveling mechanism comprising a first elongated aperture defined by the first rail and a second elongated aperture defined by the first rail, each adapted to receive a first mounting hardware and a second mounting hardware, respectively, the leveling mechanism adapted to allow the first rail to rotatingly move from the first position to a second position on the first planar surface to level the first rail with respect to the first planar surface; and
- an attachment mechanism including:
  - a locking plate configured to releasably engage a portion of the first rail;
  - a ball engaged to the locking plate;
  - a bracket configured to attach to the frame, the bracket having a surface defining a detent, the detent configured to receive the ball and releasably retain the locking plate in a fixed position relative to the bracket;
  - a spring configured to apply opposing forces on both the bracket and the locking plate; and
  - a pin extending through at least a portion of the bracket, the locking plate, and the spring, the pin configured to rotatably couple the bracket and the locking plate.

* * * * *